(12) United States Patent
Yoshino

(10) Patent No.: US 12,549,258 B2
(45) Date of Patent: Feb. 10, 2026

(54) COMMUNICATION DEVICE INCLUDING NESTED MODULATOR AND BIAS CONTROL METHOD FOR NESTED MODULATOR

(71) Applicant: NEC Corporation, Tokyo (JP)

(72) Inventor: Ken-ichiro Yoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 235 days.

(21) Appl. No.: 18/483,978

(22) Filed: Oct. 10, 2023

(65) Prior Publication Data

US 2024/0129042 A1   Apr. 18, 2024

(30) Foreign Application Priority Data

Oct. 17, 2022   (JP) .................. 2022-166415

(51) Int. Cl.
 *H04B 10/50*    (2013.01)
 *H04B 10/508*   (2013.01)
 *H04B 10/54*    (2013.01)
 *H04B 10/70*    (2013.01)
 *H04L 9/08*     (2006.01)

(52) U.S. Cl.
 CPC ....... *H04B 10/54* (2013.01); *H04B 10/50575* (2013.01); *H04B 10/508* (2013.01); *H04B 10/50* (2013.01); *H04B 10/505* (2013.01); *H04B 10/5053* (2013.01); *H04B 10/5057* (2013.01); *H04B 10/50572* (2013.01);
(Continued)

(58) Field of Classification Search
 CPC .......... H04B 10/54; H04B 10/50575; H04B 10/508; H04B 10/50; H04B 10/505; H04B 10/5053; H04B 10/5057; H04B 10/50572; H04B 10/50577; H04B 10/70; H04B 10/556; H04L 9/0852; G02F 1/212

USPC ............... 398/140–172, 182–201
See application file for complete search history.

(56) References Cited

U.S. PATENT DOCUMENTS 5,515,196 A * 5/1996 Kitajima ............ H04B 10/2537
  398/186
7,733,193 B2 * 6/2010 Kershteyn ........... H04L 27/2096
  359/239
(Continued)

FOREIGN PATENT DOCUMENTS

JP  2019-216413 A    12/2019
WO  2020/189348 A1   9/2020

OTHER PUBLICATIONS

Zhang et al, State preparation robust to modulation signal degradation by use of a dual parallel modulator, Apr. 2020, Optics Express, All Document. (Year: 2020).*
(Continued)

*Primary Examiner* — Dibson J Sanchez
(74) *Attorney, Agent, or Firm* — Sughrue Mion, PLLC

(57) ABSTRACT

A communication device includes a nested modulator composed of sub modulators and a phase shifter. The nested modulator is controlled by: modulating a double pulse by phase and intensity modulation according to transmission information, wherein the double pulse thus modulated is transmitted to another communication device; controlling bias voltages applied respectively to the sub modulators so that a first error rate on the intensity modulation is minimized; and controlling a bias voltage applied to the phase shifter so that a second error rate on the phase modulation is minimized.

15 Claims, 15 Drawing Sheets

(52) U.S. Cl.
CPC ........ *H04B 10/50577* (2013.01); *H04B 10/70* (2013.01); *H04L 9/0852* (2013.01)

(56) References Cited

U.S. PATENT DOCUMENTS

| | | | | |
|---|---|---|---|---|
| 10,742,324 | B1* | 8/2020 | Padmaraju | H04B 10/541 |
| 11,888,978 | B1* | 1/2024 | Wang | G06F 1/105 |
| 2002/0063934 | A1* | 5/2002 | Sakauchi | H04B 10/2513 |
| | | | | 398/140 |
| 2005/0047601 | A1* | 3/2005 | Shields | H04B 10/70 |
| | | | | 380/283 |
| 2006/0280509 | A1* | 12/2006 | Tomaru | H04L 9/0858 |
| | | | | 398/188 |
| 2007/0122161 | A1* | 5/2007 | Charlet | H04B 10/66 |
| | | | | 398/188 |
| 2007/0133918 | A1* | 6/2007 | Cho | H04B 10/50577 |
| | | | | 385/3 |
| 2007/0212075 | A1* | 9/2007 | Yin | H04B 10/5561 |
| | | | | 398/183 |
| 2009/0074425 | A1* | 3/2009 | Tanaka | H04B 10/548 |
| | | | | 398/185 |
| 2010/0067902 | A1* | 3/2010 | Sun | H04B 10/0799 |
| | | | | 398/25 |
| 2010/0195831 | A1 | 8/2010 | Tanaka et al. | |
| 2011/0150226 | A1* | 6/2011 | Cho | H04L 9/0858 |
| | | | | 380/278 |
| 2011/0173696 | A1* | 7/2011 | Dynes | H04L 9/0858 |
| | | | | 726/22 |
| 2011/0229146 | A1* | 9/2011 | Nishioka | H04B 10/548 |
| | | | | 359/279 |
| 2012/0207483 | A1* | 8/2012 | Cui | H04B 10/5057 |
| | | | | 398/188 |
| 2012/0328290 | A1* | 12/2012 | Yuan | H04L 9/0855 |
| | | | | 398/154 |
| 2014/0168741 | A1* | 6/2014 | Li | G02F 1/0123 |
| | | | | 359/239 |
| 2015/0226609 | A1* | 8/2015 | Cho | G01J 3/4535 |
| | | | | 356/477 |
| 2016/0036533 | A1* | 2/2016 | Nakashima | H04B 10/50575 |
| | | | | 398/187 |
| 2016/0156416 | A1* | 6/2016 | Shirakawa | H04B 10/5161 |
| | | | | 398/136 |
| 2017/0054511 | A1* | 2/2017 | Bianciotto | G02F 1/2255 |
| 2017/0078029 | A1* | 3/2017 | Qi | H04B 10/0795 |
| 2018/0074348 | A1* | 3/2018 | Fujita | H04B 10/5561 |
| 2018/0088359 | A1* | 3/2018 | Shirakawa | G02F 1/2257 |
| 2019/0044713 | A1* | 2/2019 | Tomita | H04B 10/70 |
| 2020/0044836 | A1* | 2/2020 | Kim | H04L 9/12 |
| 2020/0067704 | A1* | 2/2020 | Zbinden | H04B 10/07953 |
| 2021/0021352 | A1* | 1/2021 | Yoshino | H04B 10/556 |
| 2021/0083776 | A1* | 3/2021 | Tang | H04B 10/70 |
| 2022/0182151 | A1 | 6/2022 | Yoshino | |

OTHER PUBLICATIONS

Takemoto et al, Quantum key distribution over 120km using ultra-high purity single-photon source, Sep. 2015, Scientific Reports, All Document. (Year: 2015).*

Yoshino et al, Long term Field Demonstration of WDM Quantum Key Distribution System, Sep. 2013, CLEOPR, All Document. (Year: 2013).*

Extended European Search Report for EP Application No. 23202342. 4, dated on Mar. 5, 2024.

* cited by examiner

EXEMPLARY EMBODIMENT
(AN EXAMPLE OF CONSTELLATION)

IN CASE OF $DC_A = 30°$

FIRST EXAMPLE OF RECEIVER

SECOND EXAMPLE OF RECEIVER

COMMUNICATION DEVICE INCLUDING NESTED MODULATOR AND BIAS CONTROL METHOD FOR NESTED MODULATOR

INCORPORATION BY REFERENCE

This application is based upon and claims the benefit of priority from Japanese Patent Application No. 2022-166415, filed on Oct. 17, 2022, the disclosure of which is incorporated herein in its entirety by reference.

BACKGROUND

The present invention relates to optical communication systems, and more particularly to control techniques for a nested modulator included in a communication device.

According to the phase-time coding (or YZ-state) scheme, as illustrated in FIG. 1, a relative phase between the two consecutive pulses is binary-modulated and any one of the two consecutive light pulses is intensity-modulated to 0, thereby generating the two consecutive light pulses in four states. More specifically, the four states are generated as follows: Y0 state in which a leading pulse p1 is advanced 90° in phase with respect to a following pulse p2; Y1 state in which the leading pulse p1 is delayed 90° in phase with respect to the following pulse p2; Z0 state in which only a leading pulse P1 is extinguished; and Z1 state in which only a following pulse P2 is extinguished.

International publication no. WO2020/189348 (Patent Document 1) discloses a nested modulator that generates such four states and its control method. The nested modulator includes a main interferometer and two sub interferometers. Two sub interferometers are MZ (Mach-Zehnder) modulators $MZ_A$ and $MZ_B$ and the main interferometer is a MZ interferometer $MZ_C$. According to Patent Document 1, RF voltages are applied to the MZ modulators $MZ_A$ and $MZ_B$ in a predetermined order to generate predetermined phase modulation, and a voltage is applied to the MZ interferometer $MZ_C$ to generate a predetermined phase difference $\varphi$. In this manner, the four states including intensity 0 required for the phase-time coding scheme can be generated.

In order to generate four states (Y0, Y1, Z0, Z1) with accurate phase difference 0°/90° and intensity 0/1, the modulation operating points of each MZ modulator must be set correctly. The phase modulation operating points of the MZ modulators $MZ_A$ and $MZ_B$ are adjusted by their respective DC bias voltages. The MZ modulator $MZ_C$ is adjusted by the DC bias voltage to keep the predetermined phase difference $\varphi$. However, in actuality, the optimal DC bias voltage varies over time, so that some mechanism to adjust the DC bias voltage is required. According to Patent Document 1, the output optical intensities of the MZ modulators $MZ_A$, $MZ_B$ and $MZ_C$ are monitored to control their respective DC biases so as to obtain the expected phase modulation result.

Japanese patent unexamined publication no. P2019-216413A (Patent Document 2) discloses an alternative method, by which the receive-side bit error rate is monitored to control the DC bias of a transmit-side modulator. According to Patent Document 2, the DC bias of the transmit-side phase modulator is controlled to minimize the receive-side quantum bit error rate QBER in a quantum communication system.

SUMMARY

However, Patent Document 2 discloses the DC bias control method which is nothing more than one means of performing the arm-length matching adjustment of asymmetric MZ interferometers between the transmitter and receiver. According to Patent Document 2, the receiver calculates a quantum-bit error rate QBER and feeds it back to the transmitter. The transmitter adjusts the DC bias of a phase modulator in one arm of the asymmetric MZ interferometer to minimize the fed-back QBER. Thus, Patent Document 2 only discloses a DC bias control method assuming the asymmetric MZ interferometer and does not teach how to control the DC bias of a nested modulator.

An object of the present invention is to provide a communication device including a nested modulator, which can minimize the bit error rate at a receiver side in an optical communication system, and a method for controlling the bias of the nested modulator.

According to an aspect of the invention, a communication device in an optical communication system, includes: a nested modulator of Mach-Zehnder configuration including: first and second sub modulators; and a phase shifter that provides a predetermined phase difference between outputs of the first and second sub modulators; and a controller configured to control the nested modulator by: a) modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity, wherein the double pulse thus modulated is transmitted to another communication device of the optical communication system; b) controlling bias voltages applied respectively to the first and second sub modulators based on the transmission information and reception information at the other communication device so that a first error rate on the intensity modulation is minimized; and c) controlling a bias voltage applied to the phase shifter based on the transmission information and the reception information so that a second error rate on the phase modulation is minimized.

According to another aspect of the invention, a bias control method in a transmitter including: a nested modulator of Mach-Zehnder configuration which includes first and second sub modulators and a phase shifter that provides a predetermined phase difference between outputs of the first and second sub modulators; and a controller configured to control the nested modulator, the bias control method includes: a) modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity, wherein the double pulse thus modulated is transmitted to a receiver of the optical communication system; b) controlling bias voltages applied respectively to the first and second sub modulators based on the transmission information and reception information at the receiver so that a first error rate on the intensity modulation is minimized; and c) controlling a bias voltage applied to the phase shifter based on the transmission information and the reception information so that a second error rate on the phase modulation is minimized.

According to still another aspect of the invention, an optical communication system comprising a transmitter and a receiver, the transmitter includes: a nested modulator of Mach-Zehnder configuration including: first and second sub modulators; and a phase shifter that provides a predetermined phase difference between outputs of the first and second sub modulators; and a controller configured to control the nested modulator by: modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity; and transmitting the double pulse thus modulated to the receiver; the receiver includes: a receiving unit configured to receive the double pulse subjected to intensity and phase modulation to obtain reception information; and an error calculator that calculates a first error rate on the intensity modulation and a second error rate on the phase modulation based on a first part of the transmission information and a second part of the reception information, wherein the first part and the second part are notified between the transmitter and the receiver, wherein the controller of the transmitter controls bias voltages applied respectively to the first and second sub modulators so that the first error rate is minimized, and controls a bias voltage applied to the phase shifter so that the second error rate is minimized.

According to the present invention, the bit error rate at a receiver side can be minimized by controlling a nested modulator.

DETAILED DESCRIPTION

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each embodiment can be appropriately combined with other embodiments.

Overview of Example Embodiments

Hereinafter, according to an example embodiment of the present invention, a communication device includes a nested modulator and a controller that controls the nested modulator. The nested modulator includes: two Mach-Zehnder (MZ) modulators connected in parallel by two waveguides (main arms) constituting a main interferometer; and a phase shifter that generates a predetermined phase difference between the output light signals of the MZ modulators.

The controller obtains a first error rate (Z-basis error rate) with respect to intensity modulation based on transmission information and information notified from the other communication device, and controls the bias voltage of each of the two MZ modulators to minimize the first error rate. Furthermore, the controller obtains a second error rate (Y-basis error rate) with respect to phase modulation based on transmission information and notified information, and controls the bias voltage of the phase shifter so as to minimize the second error rate. By thus controlling the bias voltages of the nested modulator in the communication device, the modulation operating point can be set appropriately and the bit error rate on the receiver side can be minimized.

Hereinafter, a quantum key distribution (QKD) system is exemplified as an optical communication system, and the example embodiments of the present invention are described in detail with reference to the drawings. However, the components described in the following example embodiments and examples are merely examples, and are not intended to limit the technical scope of the present invention to the examples.

1. Example Embodiment 1.1) Configuration

Figure 2:
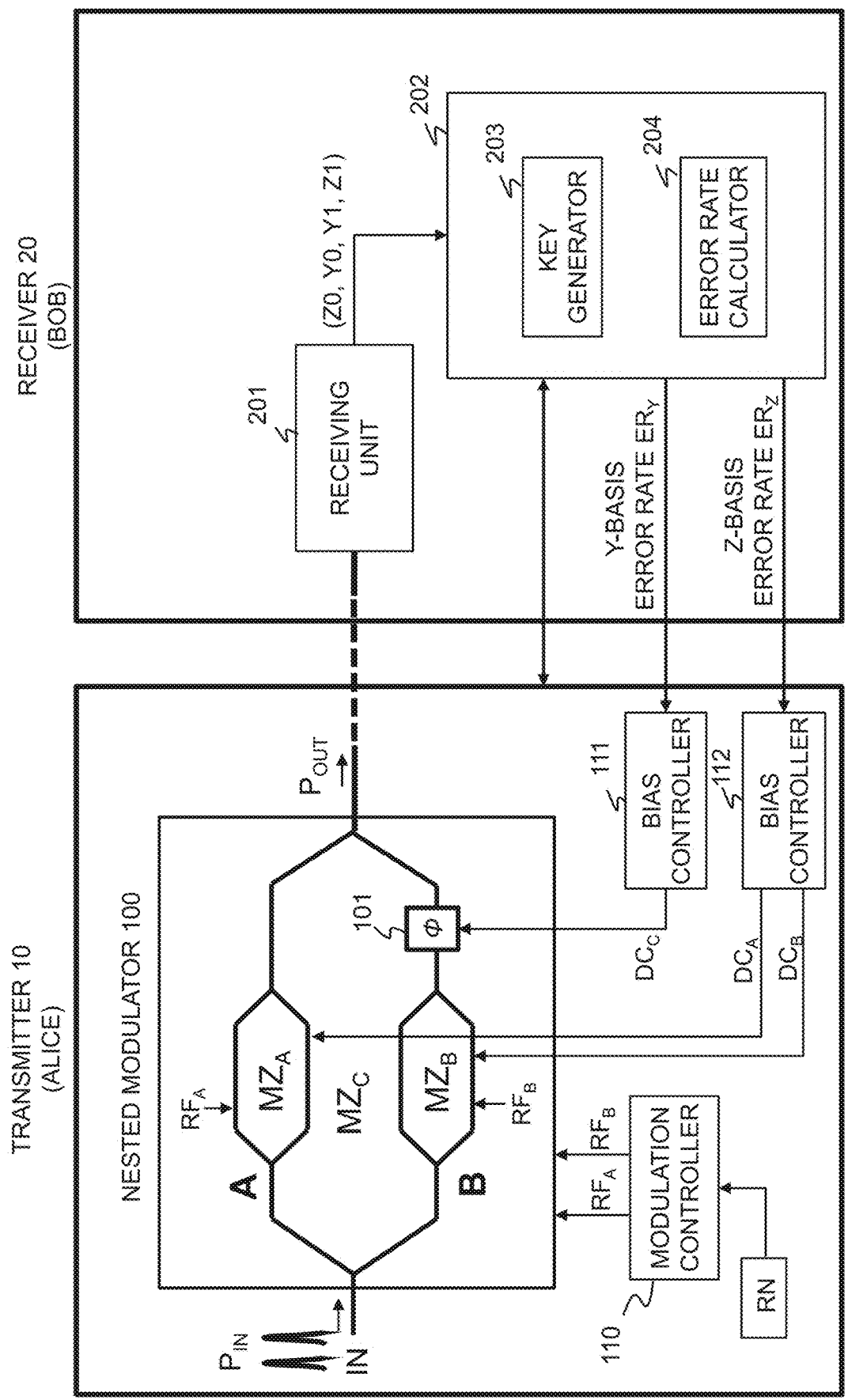
FIG. 2 is a block diagram illustrating the schematic configuration of an optical communication system including a receiver and a transmitter according to an example embodiment of the present invention.

As illustrated in FIG. 2, an optical communication system according to the present example embodiment includes a transmitter 10 (communication device) and a receiver 20 (the other communication device) which are optically connected through an optical transmission line such as an optical fiber or free space (not shown in the figure). Furthermore, data communication between the transmitter 10 and the receiver 20 can be performed through communication channels such as a packet network (not shown in the figure).

The transmitter 10 includes a nested modulator 100 and a control system capable of key generation and other functions. Hereinafter, for simplicity, only a modulation controller 110, bias controllers 111 and 112, which are relevant to the present example embodiment, are illustrated.

Figure 1:
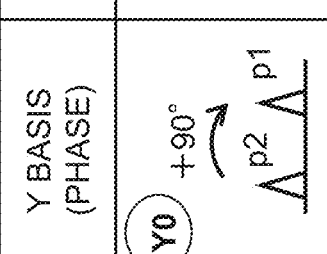
FIG. 1 is a YZ-basis state diagram showing an example of phase-time coding as a background technique.

The nested modulator 100 used in the transmitter 10 has a nested structure in which two MZ modulators $MZ_A$ and $MZ_B$ are connected respectively to the main arms A and B of a main MZ interferometer $MZ_C$. Any one of the main arms (the main arm B in FIG. 2) is provided with a phase shifter 101 to generate a relative phase modulation difference φ between the main arms. The modulation controller 110 applies voltages $RF_A$ and $RF_B$ to the MZ modulators $MZ_A$ and $MZ_B$, respectively, according to random numbers as transmission information. Such modulation control causes the nested modulator 100 to modulate each pair of two consecutive light pulses (double pulse) $P_{IN}$, allowing generation of any one of the four phase-time coding states Z0, Y0, Y1 and Z1 as shown in FIG. 1.

The bias controller 111 controls a DC bias voltage $DC_C$ applied to the phase shifter 101 to maintain the predetermined phase difference φ according to the Y-basis error rate $ER_Y$ received from the receiver 20. The bias controller 112 controls the DC bias voltages $DC_A$ and $DC_B$ applied respectively to the MZ modulators $MZ_A$ and $MZ_B$ according to the Z-basis error rate $ER_Z$ received from the receiver 20 so that the phase modulation operating points are set appropriately.

The MZ modulators $MZ_A$ and $MZ_B$ and the phase shifter 101 are controlled as described above, allowing the nested modulator 100 to perform intensity-phase modulation of four states (Y0, Y1, Z0, Z1) on each double pulse $P_{IN}$ according to the phase-time coding scheme. The double pulse $P_{OUT}$ thus intensity-phase modulated is attenuated to a predetermined intensity and then transmitted to the receiver 20.

The receiver 20 includes a receiving unit 201 and a data processor 202. The receiving unit 201 detects four states (Y0, Y1, Z0, Z1) from each double pulse received from the transmitter 10 and outputs them as received information to the data processor 202. Specific examples of the receiving unit 201 will be described below.

The data processor 202 implements the functions of the key generator 203 and the error rate calculator 204 by software. The key generator 203 inputs reception information from the receiving unit 201, performs basis reconciliation with the transmitter 10 according to a well-known key generation procedure such as BB84 protocol, and generates basis-matched information from the reception information. The error rate calculator 204 calculates the Y-basis error rate $ER_Y$ and the Z-basis error rate $ER_Z$ by matching a part of the basis-matched reception information with a corresponding part of the basis-matched transmission information, wherein the matched bases are sent by the transmitter 10. The Y-basis error rate $ER_Y$ and the Z-basis error rate $ER_Z$ thus calculated are sent to the transmitter 10.

In the transmitter 10, the bias controller 111 controls DC bias voltage $DC_C$ according to Y-basis error rate $ER_Y$, and the bias controller 112 controls DC bias voltages $DC_A$ and $DC_B$ according to Z-basis error rate $ER_Z$. The sequence of bias control will be explained below with reference to FIG. 3.

1.2) Bias Control

Figure 3:
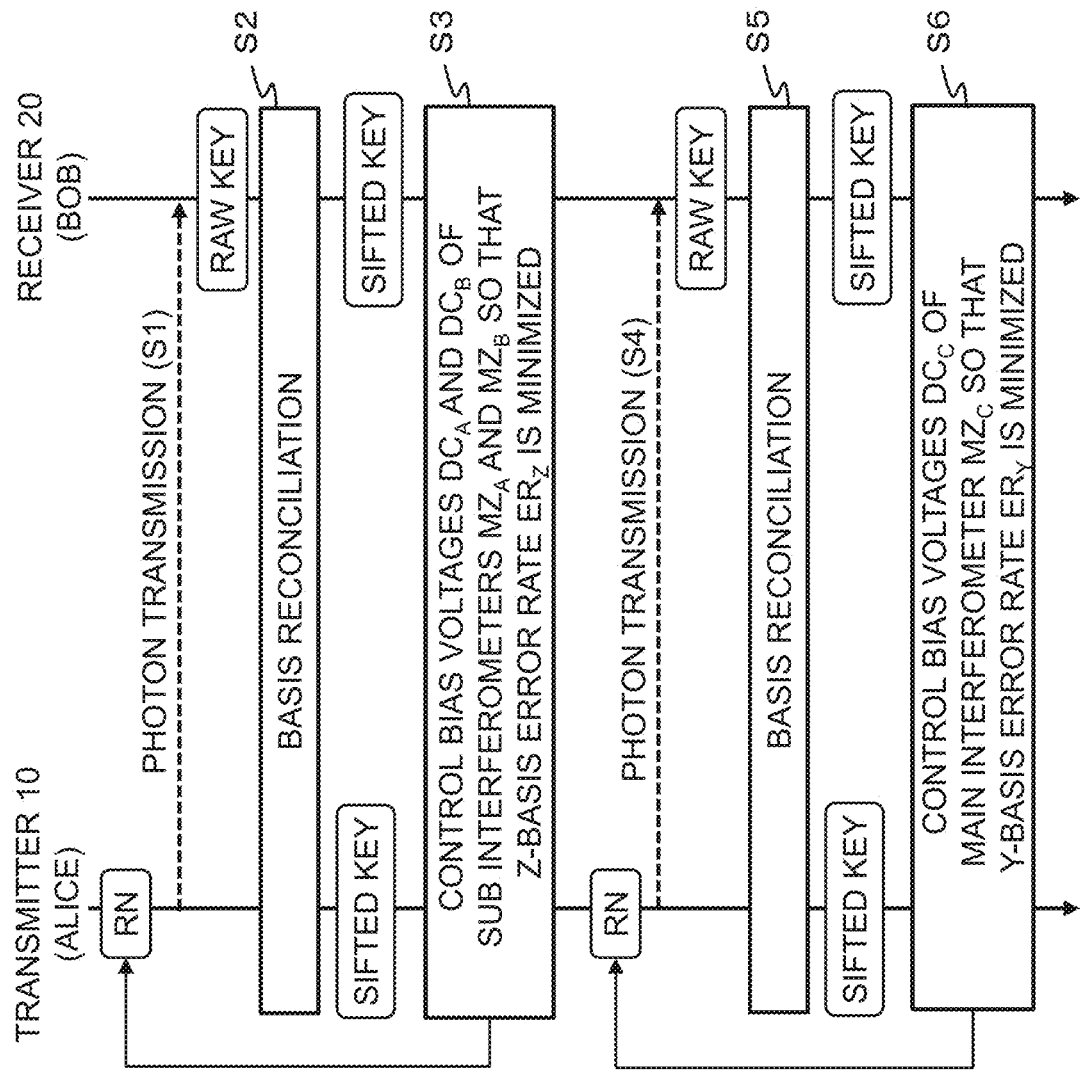
FIG. 3 is a sequence diagram illustrating the schematic operation of an optical communication system including a transmitter and a receiver.

Referring to FIG. 3, at the transmitter 10, the nested modulator 100 performs the intensity-phase modulation on each double pulse according to transmission information (RN: random number) as described above, attenuates the modulated double pulses to a predetermined intensity (below single-photon level), and then transmits it to the receiver 20 (operation S1). The information obtained from double pulses that could be received by the receiver 20 is referred to as a raw key. In actuality, many light pulses may be lost in the optical transmission line or may be received erroneously due to noise. It is assumed that synchronization of bit positions is established between the transmitter 10 and the receiver 20 according to a synchronization signal or other means.

Subsequently, basis reconciliation is performed between the transmitter 10 and the receiver 20, by which only bits with matched basis Y or Z are extracted to generate a sifted key at the transmitter 10 and the receiver 20, respectively (operation S2). Specifically, in the basis reconciliation, bases Y/Z are selected at both of the transmitter 10 and the receiver 20 and exchanged with one another. Only the random number and the raw key with the same bases Y/Z selected by the transmitter 10 and the receiver 20 are extracted as the sifted key.

Then, a part of the sifted key (about a few percent of the total) is notified between transmitter 10 and receiver 20 to calculate the error rate $ER_Z$ in the Z basis of the sifted key of the receiver 20. The bias controller 112 of the transmitter 10 controls the DC bias voltages $DC_A$ and $DC_B$ of the MZ modulators $MZ_A$ and $MZ_B$ of the nested modulator 100 to minimize the error rate $ER_Z$ in the Z basis (operation S3). Note that the key notified for the error rate calculation is discarded.

The reason why the Z-basis error rate $ER_Z$ is used for DC bias control of the MZ modulators $MZ_A$ and $MZ_B$, which are sub interferometers, is as follows. Minimizing the Z-basis error rate $ER_Z$ is equivalent to extinguishing either pulse P1 or P2 in the Z basis to the extinction state with an optical intensity of 0. To set the intensity of output pulse of the nested modulator 100 to 0, the MZ modulators $MZ_A$ and $MZ_B$ are both in the extinction state. It is necessary to properly set the modulation operating points of the MZ modulators $MZ_A$ and $MZ_B$ by adjusting the DC bias voltages $DC_A$ and $DC_B$. Accordingly, it is possible to minimize the error rate $ER_Z$ of the Z basis by controlling the DC bias voltages of the MZ modulators $MZ_A$ and $MZ_B$.

After having minimized the error rate $ER_Z$ in the Z basis, the transmitter 10 performs photon transmission as described above (operation S4), and the sifted key is generated by basis reconciliation between the transmitter 10 and receiver 20 (operation S5).

Then, a part of the sifted key is notified between transmitter 10 and receiver 20 to calculate the error rate $ER_Y$ in the Y basis of the sifted key at the receiver 20. The bias controller 112 of the transmitter 10 controls the DC bias voltages $DC_C$ of the main interferometer, the MZ interferometer $MZ_C$, to minimize the error rate $ER_Y$ in the Y basis (operation S6). Note that the key notified for the error rate calculation is discarded.

The reason why the error rate $ER_Y$ of the Y basis is used for DC bias control of the MZ interferometer $MZ_C$ is as follows. Minimizing the error rate $ER_Y$ of the Y basis is equivalent to setting the phase difference between the two pulses p1 and p2 of the Y basis to 90° (see FIGS. 9 and 10 for details). The phase difference between the two pulses p1 and p2 of the Y basis is controlled according to the magnitude of the phase φ of the phase shifter 101, i.e., the DC bias voltage $DC_C$ of the main interferometer, the MZ interferometer $MZ_C$. Accordingly, the phase difference between the two pulses p1 and p2 in the Y basis can be set to exactly 90° by controlling the DC bias voltage of the phase shifter 101 to minimize the error rate $ER_Y$ of the Y basis.

As illustrated in FIG. 3, after the error rate $ER_Z$ in the Z basis has been minimized, the error rate $ER_Y$ in the Y basis is minimized, allowing fast convergence of the operation point. This is because even if the DC bias voltage $DC_C$ of the MZ interferometer $MZ_C$ is out of its optimal value, the DC biases of the MZ modulators $MZ_A$ and $MZ_B$ can converge to their optimal values. Conversely, if the DC biases of the MZ modulators $MZ_A$ and $MZ_B$ are out of their optimal values, the DC bias of the MZ interferometer $MZ_C$ will not converge to its optimal value. The details will be described below (see FIGS. 11 to 13).

Figure 4:
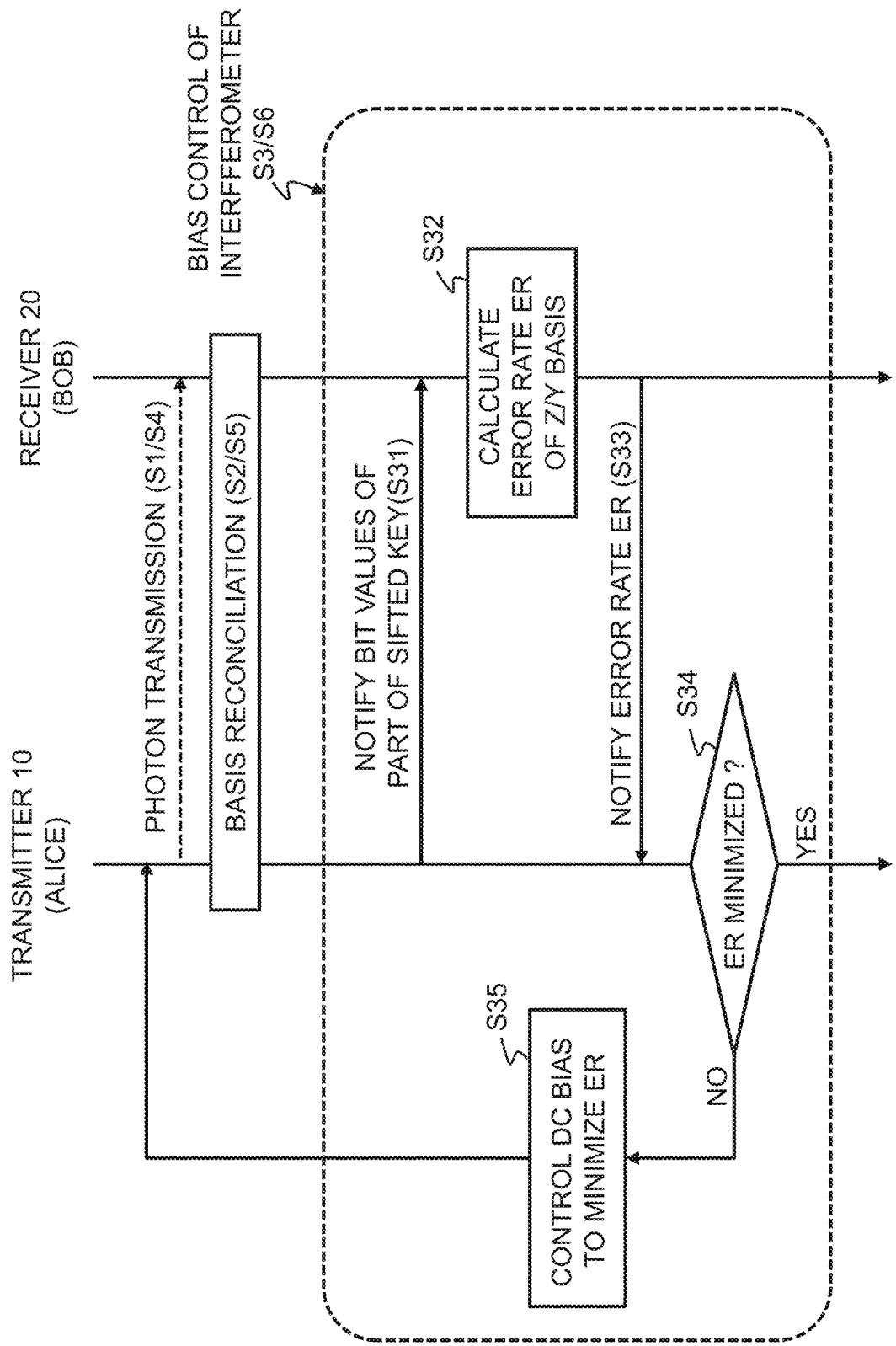
FIG. 4 is a flowchart illustrating an example of the bias control in FIG. 3.

As illustrated in FIG. 4, in the case where the receiver 20 includes an error rate calculator 204, the bias control based on the error rate in the Z or Y basis is performed as follows. The transmitter 10 notifies a part of the sifted key of its own to the receiver 20 through the communication channel (operation S31).

The error rate calculator 204 of the receiver 20 calculates the error rate ER of the Z/Y basis based on a portion of the sifted key received from the transmitter 10 and a portion of the corresponding sifted key of its own (operation S32) and notifies the error rate ER of the Z/Y basis to the transmitter 10 (operation S33).

The bias controller (111 or 112) of the transmitter 10 determines whether the error rate ER notified by the receiver 20 is a minimum value (operation S34). It may be determined whether it is a minimum value depending on whether the error rate is close to 0, i.e., less than or equal to a predetermined value close to 0. Alternatively, it is possible to identify the minimum value from the most recently calculated error rates. If the error rate ER is not the minimum value (NO in operation S34), the bias controller adjusts the corresponding bias voltage in the direction to minimize the error rate ER (operation S35). After the bias voltage is adjusted, the photon transmission, basis reconciliation and bias control as described above are repeated. When the error rate ER reaches the minimum value, the DC bias control is terminated to proceed to the next process.

The bias voltage that minimizes the error rate ER may be set as follows. First, an error rate ER1 is calculated at the current bias voltage. Subsequently, error rates ER2 and ER3 are calculated by increasing (+α) and decreasing (−α) the bias voltage by a predetermined step α, respectively. The bias voltage that produces the minimum value among ER1, ER2, and ER3 thus obtained is set as the optimal value.

As described above, the bias controller 112 controls the DC bias voltages $DC_A$ and $DC_B$ applied respectively to the MZ modulators $MZ_A$ and $MZ_B$ so that the error rate $ER_Z$ in the Z basis is minimized. After the error rate $ER_Z$ in the Z basis has been minimized, the bias controller 111 controls the DC bias voltage $DC_C$ applied to the phase shifter 101 of the MZ interferometer $MZ_C$ to minimize the error rate $ER_Y$ in the Y basis.

1.3) Advantageous Effect

As described above, according to the present example embodiment, the Z-basis error rate $ER_Z$ is obtained based on transmission information and information notified from receiver 20, and the bias voltages $DC_A$ and $DC_B$ of the sub interferometers, MZ modulators $MZ_A$ and $MZ_B$, respectively, are controlled to minimize the Z-basis error rate $ER_Z$. Subsequently, the Y-basis error rate $ER_Y$ is obtained based on the transmission information and notified information and the bias voltage $DC_C$ of the phase shifter 101 is controlled to minimize the Y-basis error rate $ER_Y$.

In this manner, the bias voltages of the nested modulator 100 of the transmitter 10 are controlled to properly set the modulation operating point, allowing the bit error rate at the receiving side to be minimized. When doing so, it is preferable that the minimization process of the Z-basis error rate $ER_Z$ is performed first, followed by the minimization process of the Y-basis error rate $ER_Y$. The reason is that the nested modulator 100 can converge more quickly to the appropriate operating point.

2. Example

Next, a phase-time coding QKD system will be illustrated and the transmitter (Alice) and receiver (Bob) according to an example of the invention will be described in more detail.

2.1) Configuration

Figure 5:
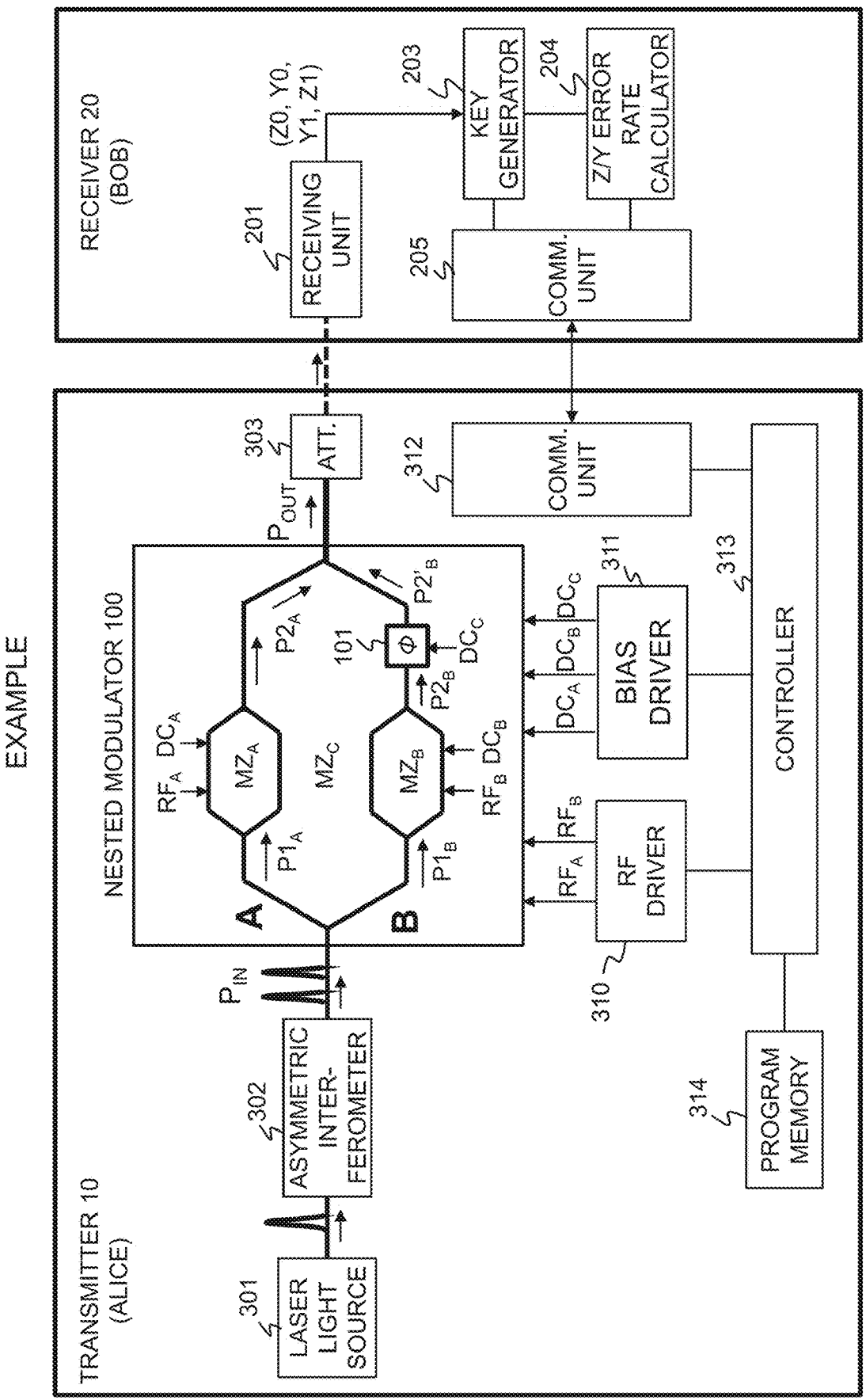
FIG. 5 is a block diagram illustrating the schematic structure of a quantum cryptographic key distribution system according to an example of the present invention.

As illustrated in FIG. 5, the example of a one-way QKD system includes the transmitter 10 and the receiver 20 which are connected by an optical transmission line. Quantum keys can be delivered from the transmitter 10 to the receiver 20 according to any of various quantum cryptographic key delivery algorithms. The transmitter 10 and the receiver 20 are also communicatively connected through a normal classical communication channel.

The transmitter 10 includes a laser light source 301, an asymmetric interferometer 302 as an optical transmission system, a nested modulator 100 and an attenuator 303. The transmitter 10 further includes, as a control system, an RF driver 310, bias driver 311, communication unit 312, controller 313 and program memory 314.

The RF driver 310 applies RF voltages $RF_A$ and $RF_B$ respectively to MZ modulators $MZ_A$ and $MZ_B$ of the nested modulator 100 in accordance with the control of the controller 313. The bias driver 311 applies bias voltages $DC_A$ and $DC_B$ to the MZ modulators $MZ_A$ and $MZ_B$, respectively, and applies bias voltage $DC_C$ to the phase shifter 101 of the MZ interferometer $MZ_C$ in accordance with the control of the controller 313.

The controller 313 is at least one processor or CPU (Central Processing Unit) capable of executing computer programs. The controller 313 performs the control of the DC bias voltages $DC_A$, $DC_B$ and $DC_C$ as described above, and the control of the RF voltages $RF_A$ and $RF_B$ according to random numbers by executing the programs stored in the program memory 314.

The light pulse output of the laser light source 301 is split in time into coherent double pulses by passing through the asymmetric interferometer 302. A train of double pulses is encoded by the nested modulator 100 according to random numbers in a phase-time coding scheme (see FIG. 1). The coded double pulse train is attenuated below the single-photon level by the attenuator 303 and then transmitted through the optical transmission line to the receiver 20.

The receiver 20 includes, as its functional configuration, a receiving unit 201, key generator 203, error calculator 204, and communication unit 205. The receiving unit 201 detects four states (Y0, Y1, Z0, Z1) from double pulses received from the transmitter 10 and outputs the detected data as a raw key to the key generator 203. Based on the raw key, the key generator 203 performs basis reconciliation with the transmitter 10 through the communication unit 205 to generate a sifted key with matched bases. The error rate calculator 204 calculates the Y-basis error rate $ER_Y$ and the Z-basis error rate $ER_Z$ by matching a part of the sifted key of the transmitter 10 with a corresponding part of the sifted key of the receiver 20. The Y-basis error rate $ER_Y$ and the Z-basis error rate $ER_Z$ thus calculated are sent to the transmitter 10 through the communication unit 205.

The transmitter 10 receives Y-basis error rate $ER_Y$ and Z-basis error rate $ER_Z$ from the receiver 20 through the communication unit 312. The controller 313 controls DC bias voltage $DC_C$ according to Y-basis error rate $ER_Y$ and controls DC bias voltages $DC_A$ and $DC_B$ according to Z-basis error rate $ER_Z$.

<Nested Modulator>.

The sub interferometers (MZ modulators $MZ_A$ and $MZ_B$) of the nested modulator 100 in FIG. 5 have the following configuration. Hereinafter, any one of MZ modulators $MZ_A$ and $MZ_B$ is referred to as MZ modulator MZ.

Figure 6:
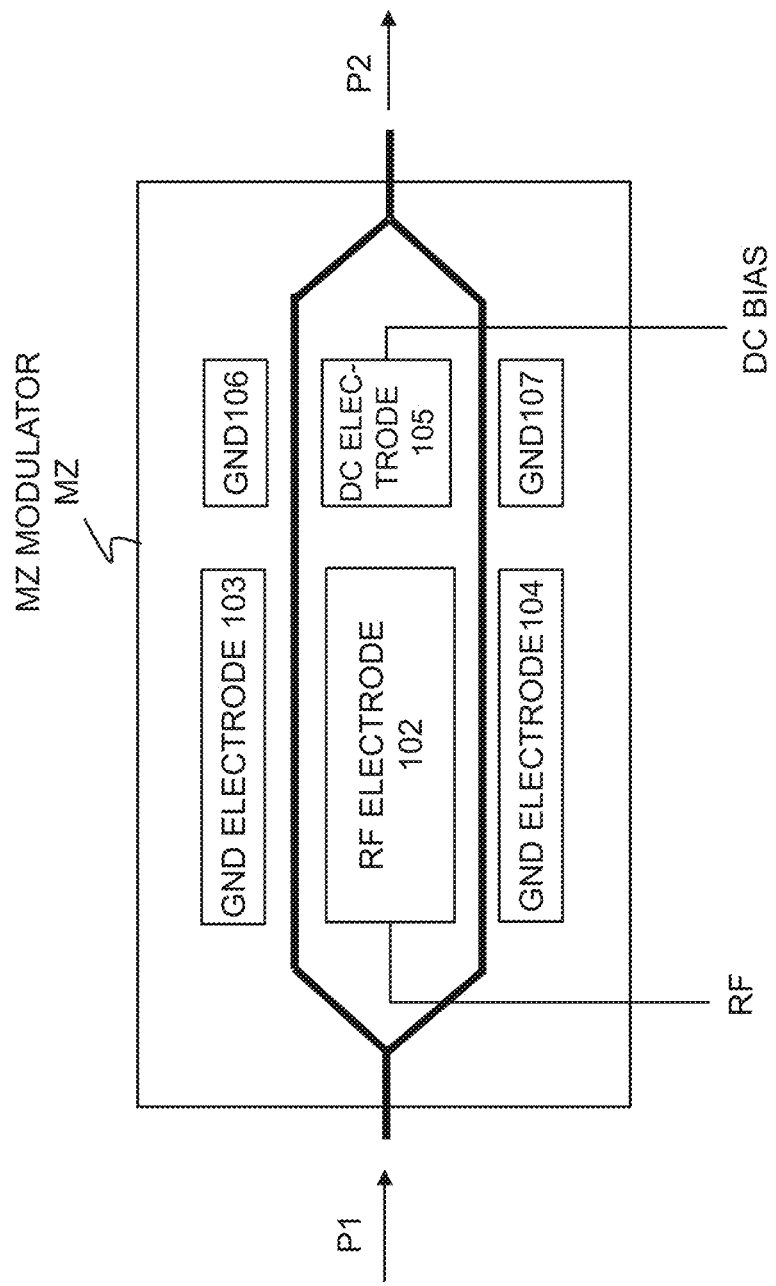
FIG. 6 is a schematic diagram illustrating an example of the planar configuration of a MZ modulator in the nested modulator as illustrated in FIG. 5.

Referring to FIG. 6, the MZ modulator MZ has such a structure that an RF (Radio Frequency or High Frequency) electrode 102 extending in a waveguide direction is provided between two waveguides (sub arms) of the MZ interferometer and two reference GND electrodes 103 and 104 are provided on the outsides of the two sub arms, respectively. Accordingly, electric fields in the opposite directions according to the applied voltage are applied to the upper and lower sub arms according to the polarity of the voltage applied to the RF electrode, causing the refractive index of each sub arm to vary in the opposite directions due to the electro-optical effect. This change in refractive index causes phase shifts in the opposite directions between the upper and lower sub arms, which allows phase modulation of pulses passing through the MZ modulator.

For example, when an RF voltage corresponds to a phase difference of 0, an input light pulse P1 is output as a light pulse P2 with the same intensity (ON state). When the RF voltage corresponds to a phase difference of 180° (degrees), two separate light pulses are canceled to output an output pulse P2 in the extinction state (OFF state). Hereinafter, the RF voltage that provides a phase difference 0° will be referred to as "0° RF voltage" for convenience.

The MZ modulator MZ has the DC bias electrode 105 between the sub arms and GND electrodes 106 and 107 outside the sub arms facing the DC bias electrode 105 in order to generate a desired phase difference. By controlling the DC bias voltage ($DC_A$ or $DC_B$) applied to the electrode 105, the modulation operating point of phase modulation can be adjusted.

The phase shifter 101 of the nested modulator 100 provides a relative phase modulation difference φ between the main arms. The phase shifter 101 may have the same configuration as the electrodes for DC bias and GND electrodes illustrated in FIG. 6. The voltage $DC_C$ applied to the DC bias electrode can be controlled such that the phase operating point of the nested modulator 100 can be adjusted to provide a desired phase difference φ.

Figure 7:
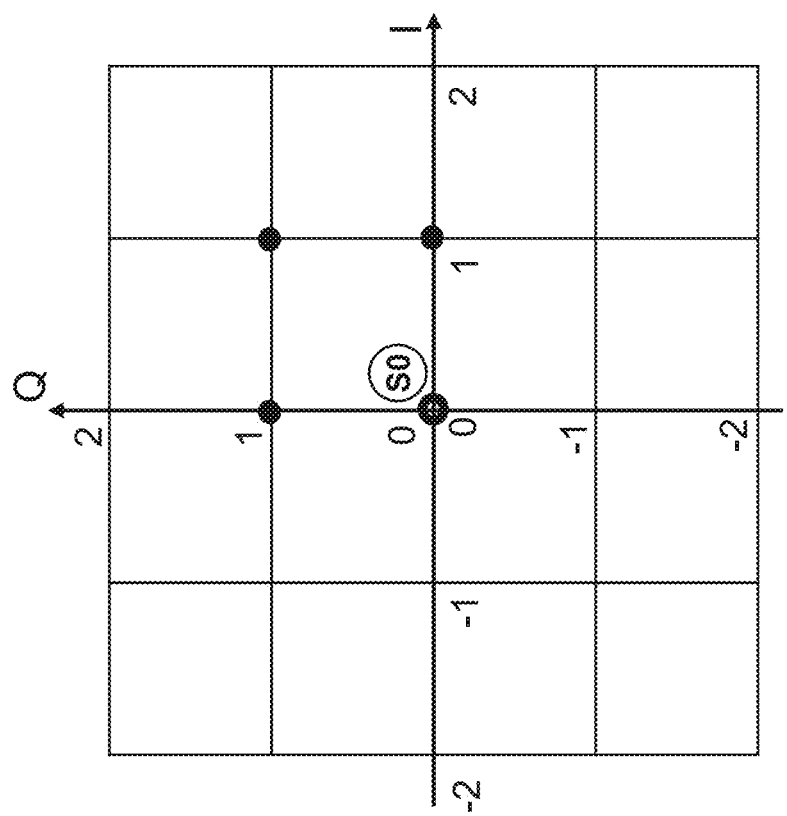
FIG. 7 is a diagram illustrating an example of the constellation of signal points on I-Q plane of a light pulse obtained by the nested modulator as illustrated in FIG. 5.

The nested modulator 100 modulates input light pulses according to the control of the controller 313 to generate a four-state light pulse including zero intensity. These four states correspond to four signal points on the IQ plane. FIG. 7 shows an example of the signal point constellation. The modulation operation of the nested modulator 100 is described below.

<Modulation Operation of Nested Modulator>.

Returning to FIG. 5, each pulse of the input double pulse $P_{IN}$ is split into light pulses $P1_A$ and $P1_B$ at the split point of the MZ interferometer $MZ_C$. The split light pulses $P1_A$ and $P1_B$ are input to the MZ modulators $MZ_A$ and $MZ_B$, respectively. The MZ modulators $MZ_A$ and $MZ_B$ perform predetermined phase modulation on split light pulses $P1_A$ and $P1_B$, respectively, and output phase-modulated light pulses $P2_A$ and $P2_B$, respectively. The split light pulse $P2_B$ is further phase-modulated by the phase shifter 101 providing a predetermined phase difference φ between the main arms to generate a split light pulse P2'B. Thus, the split light pulse $P2_A$ on the main arm A and the split light pulse P2'B on the main arm B are combined to output a double pulse $P_{OUT}$.

As illustrated in FIG. 7, the output light pulse OUT has four states including the intensity of 0 (constellation signal point S0). The arrangement of three constellation signal points other than the constellation signal point S0 having the intensity of 0 is not limited to FIG. 7. The arrangement of the four constellation signal points is dependent on: the depth of phase modulation responsive to the RF voltage $RF_A$ and $RF_B$ applied respectively to the MZ modulator $MZ_A$ and $MZ_B$; and the amount of phase shift responsive to the bias voltage $DC_C$ applied to the phase shifter 101. It should be noted that the numerical values on the I-axis and the Q-axis in FIG. 7 are values in arbitrary unit for indicating a relative positional relationship. It is the same with FIG. 9 and FIGS. 11-13 as shown below.

There are two methods for generating the constellation signal point S0 having the intensity of 0 shown in FIG. 7 as follows:

1) The RF voltages $RF_A$ and $RF_B$ are set so that both the MZ modulators $MZ_A$ and $MZ_B$ are in OFF state (extinction state) (First example); and
2) The RF voltages $RF_A$, $RF_B$ and bias voltage $DC_C$ are set so that the split light pulse $P2_A$ and the split light pulse P2'B are canceled due to the phase difference of 180° (Second example). Hereinafter, these first and second examples will be described in detail.

3. Specific Examples

Figure 8:
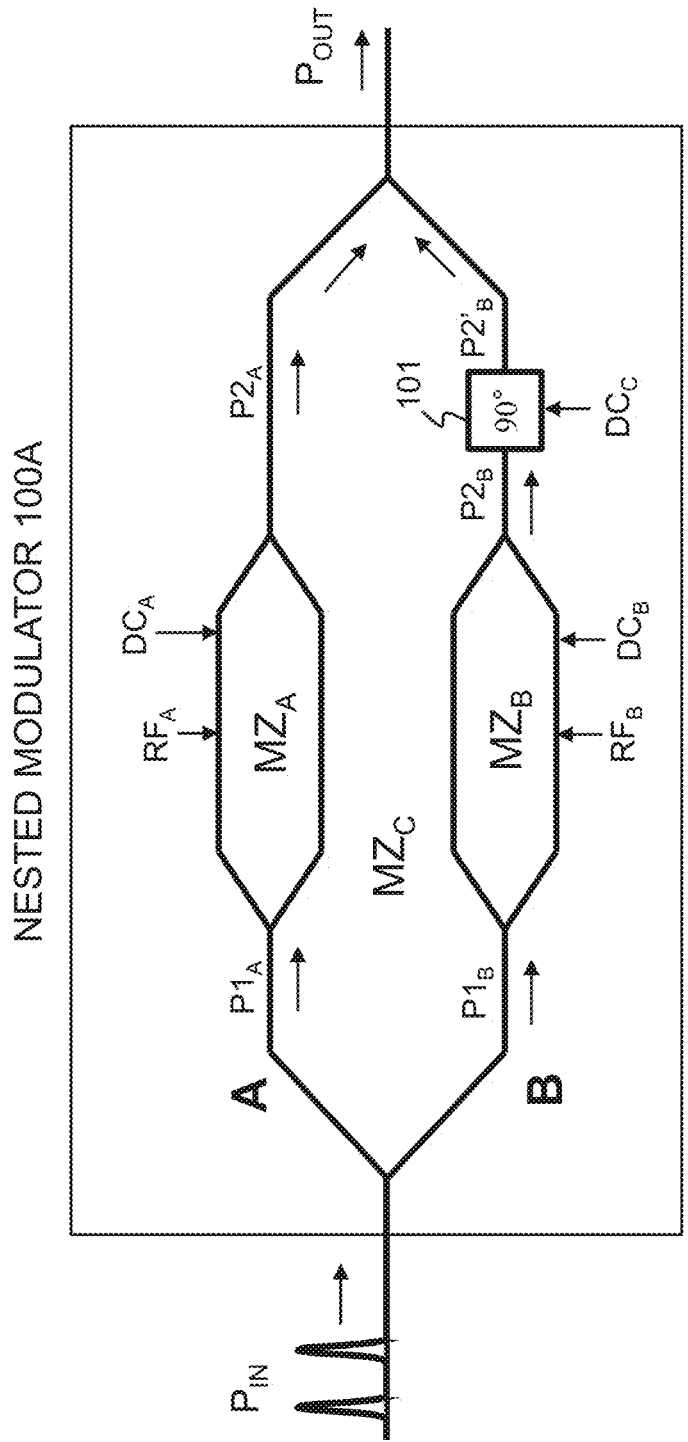
FIG. 8 is a schematic diagram illustrating an example of the nested modulator used in the present example.

As illustrated in FIG. 8, it is assumed that the nested modulator 100A controls the bias voltage $DC_C$ of the phase shifter 101 so that the phase difference φ of the MZ interferometer $MZ_C$ is set at 90°.

The intensity or power of a light pulse shall be normalized to a maximum value of "1" and expressed as a relative numerical value between 0 and 1. Assuming that the intensity or power is proportional to the square of the amplitude, the amplitude of a light pulse will be described with a similarly normalized value.

<Modulation Operation>

Figure 9:
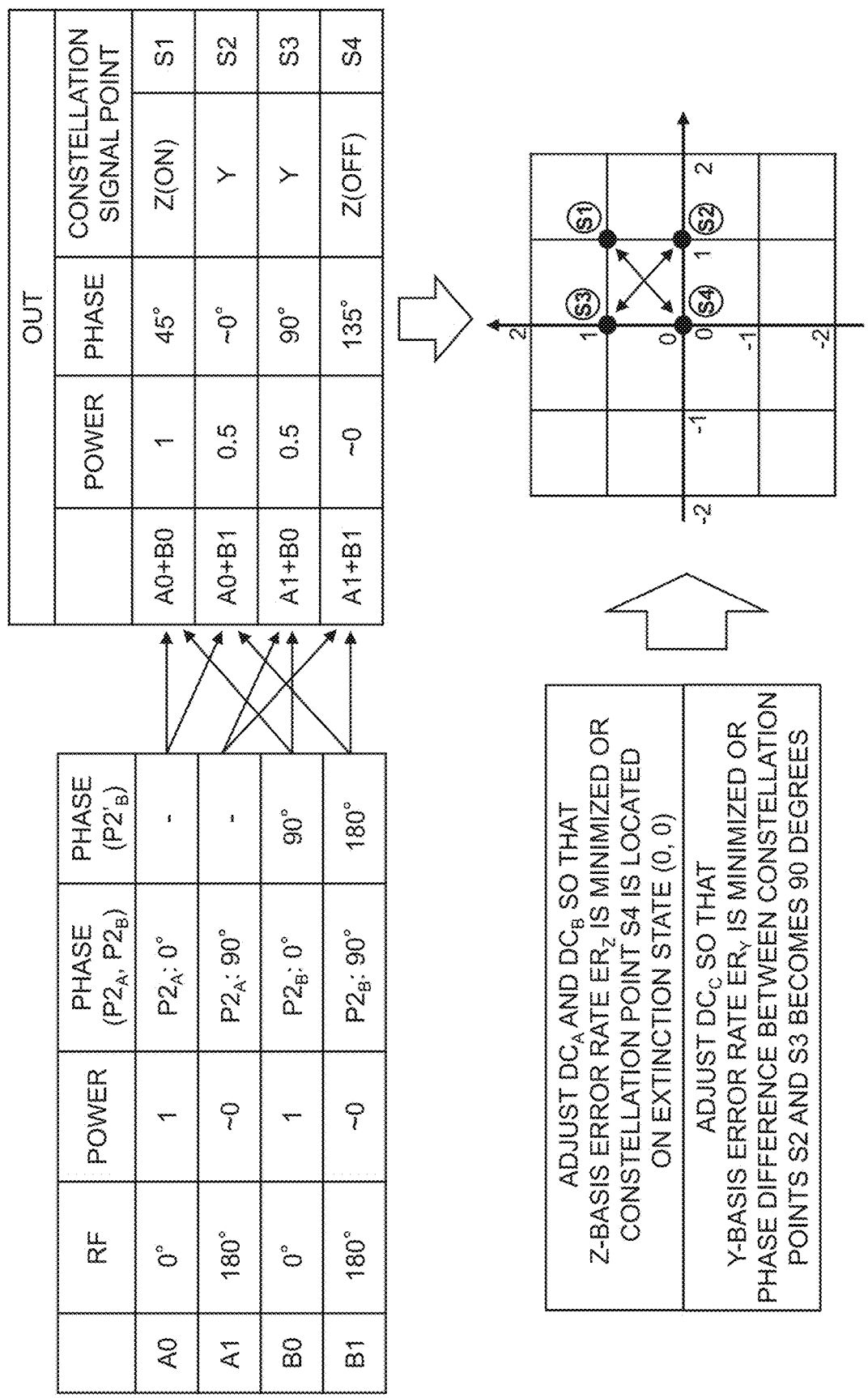
FIG. 9 is a diagram illustrating a change in amplitude and phase, a constellation of signal points finally obtained, and the relationship between DC bias voltage and signal point for explaining the operation of the nested modulator as illustrated in FIG. 8.

As illustrated in FIG. 9, the nested modulator 100A can generate a basis that is any of the four states according to the RF voltages $RF_A$ and $RF_B$. In other words, the MZ modulator $MZ_A$ to which the 0° RF voltage $RF_A$ is applied provides no phase modulation, thereby outputting the light pulse $P2_A$ having substantially the same intensity and the same phase as the input light pulse $P1_A$. Hereinafter, the light pulse $P2_A$ is referred to as "A0" when the 0° RF voltage $RF_A$ is applied to the MZ modulator $MZ_A$. The MZ modulator $MZ_A$ to which the 180° RF voltage $RF_A$ is applied is turned off, thereby outputting the light pulse $P2_A$ such that its intensity is substantially 0 and its phase is shifted by 90°. Hereinafter, the light pulse $P2_A$ is referred to as "A1" when the 180° RF voltage $RF_A$ is applied to the MZ modulator $MZ_A$.

Similarly, the MZ modulator $MZ_B$ to which the 0° RF voltage $RF_B$ is applied provides no phase modulation, thereby outputting the light pulse $P2_B$ having substantially the same intensity and the same phase as the input light pulse $P1_B$. The MZ modulator $MZ_B$ to which the 180° RF voltage $RF_B$ is applied is turned off, thereby outputting the light pulse $P2_B$ such that its intensity is substantially 0 and its phase is shifted by 90°. Further, the light pulse $P2_B$ is subjected to 90° phase modulation by the phase shifter 101. Accordingly, when a 0° RF voltage $RF_B$ is applied, the phase shifter 101 outputs an light pulse $P2'_B$ that has undergone 90° phase modulation. Hereinafter, the light pulse $P2'_B$ is referred to as "B0" when the 0° RF voltage $RF_B$ is applied to the MZ modulator $MZ_B$. Since the MZ modulator $MZ_B$ is turned off when the 180° RF voltage $RF_B$ is applied, the phase shifter 101 outputs the light pulse $P2'_B$ such that its intensity is substantially 0 and its phase is shifted by 180°. Hereinafter, the light pulse $P2'_B$ is referred to as "B1" when the 180° RF voltage $RF_B$ is applied to the MZ modulator $MZ_B$.

In this way, the A0/A1 on the main arm A and the B0/B1 on the main arm B combine to obtain a light signal $P_{OUT}$ in any of the following four states S1 to S4.

A0+B0: The 0° RF voltage is applied to both the MZ modulators $MZ_A$ and $MZ_B$, causing both to be turned on. Accordingly, A0+B0 corresponds to a constellation signal point S1 (Z (ON) basis) having an intensity of 1 and a phase of 45°.

A0+B1: The 0° RF voltage is applied to the MZ modulator $MZ_A$, and the 180° RF voltage is applied to the MZ modulator $MZ_B$. Accordingly, A0+B1 corresponds to a constellation signal point S2 (Y basis) having an intensity of 0.5 and a phase of 0°.

A1+B0: The 180° RF voltage is applied to the MZ modulator $MZ_A$, and the 0° RF voltage is applied to the MZ modulator $MZ_B$. Accordingly, A1+B0 corresponds to a constellation signal point S3 (Y basis) having an intensity of 0.5 and a phase of 90°.

A1+B1: The 180° RF voltage is applied to both MZ modulators $MZ_A$ and $MZ_B$, causing both to be turned off. Accordingly, A1+B1 corresponds to a constellation signal point S4 (Z (OFF) basis) having an intensity of 0 and a phase of 135°.

<Phase-Time Coding>

Figure 10:
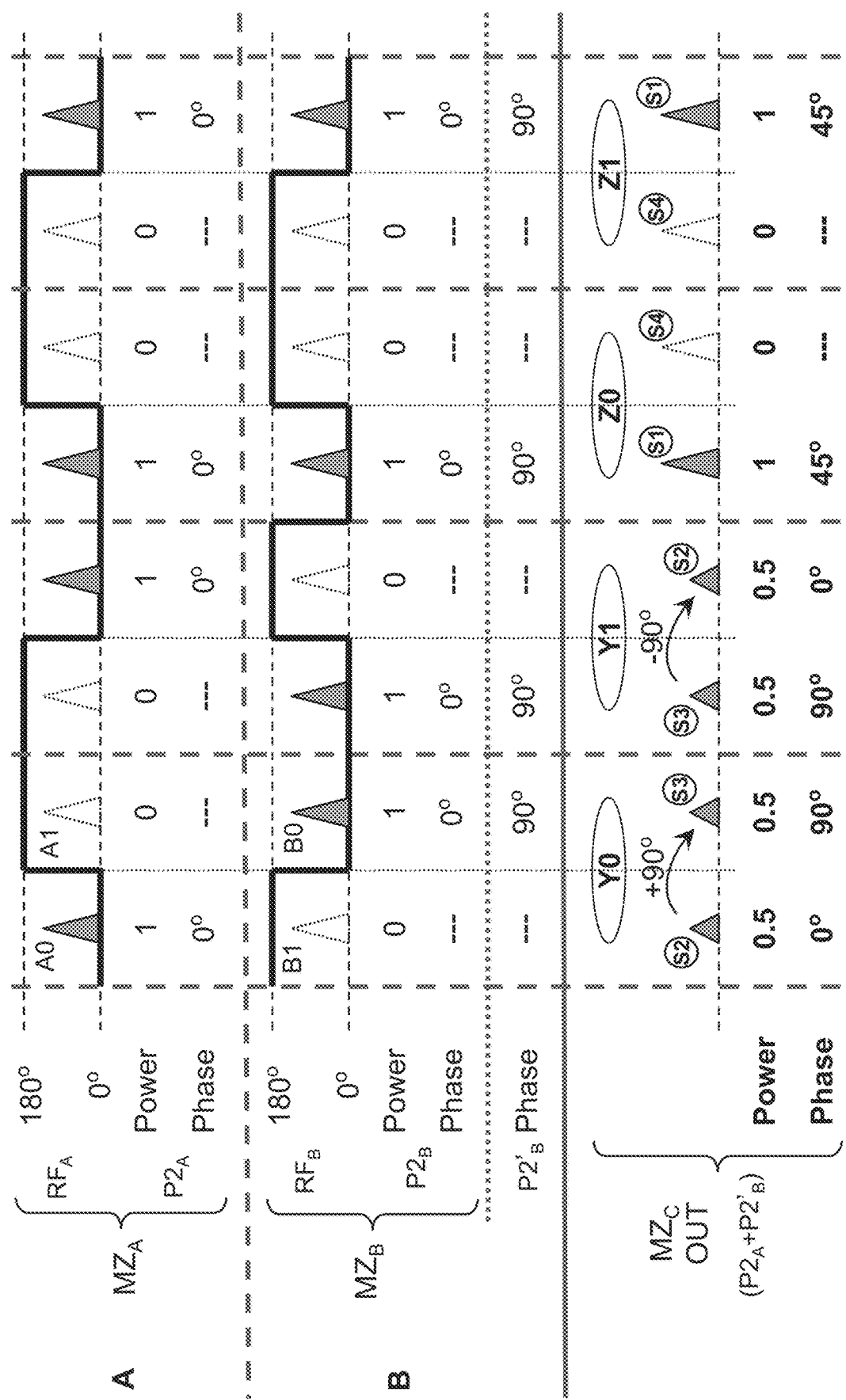
FIG. 10 is a timing chart illustrating an example of the optical modulation method using the nested modulator as illustrated in FIG. 8.

The four states Y0, Y1, Z0 and Z1 of the phase-time coding as shown in FIG. 10 can be obtained depending on the order in which the optical modulation of the above-described four states is performed on the two consecutive coherent pulses.

As illustrated in FIG. 10, the RF voltages $RF_A$ and $RF_B$ are varied. The details are as follows:

Modulation of the constellation signal point S2 (A0+B1) is performed on the leading pulse of the two consecutive pulses, and modulation of the constellation signal point S3 (A1+B0) is performed on the following pulse, resulting in Y0 state such that the following pulse is phase-shifted by +90° with respect to the leading pulse.

Modulation of the constellation signal point S3 (A1+B0) is performed on the leasing pulse of the two consecutive pulses, and modulation of the constellation signal point S2 (A0+B1) is performed on the following pulse, resulting in Y1 state such that the following pulse is phase-shifted by −90° with respect to the leading pulse.

Modulation of the constellation signal point S1 (A0+B0) is performed on the leading pulse of the two consecutive pulses, and modulation of the constellation signal point S4 (A1+B1) is performed on the following pulse, resulting in Z0 state such that the leading pulse has an intensity of 1 and the following pulse has an intensity of 0.

Modulation of the constellation signal point S4 (A1+B1) is performed on the leading pulse of the two consecutive pulses, and modulation of the constellation signal point S1 (A0+B0) is performed on the following pulse, resulting in Z1 state such that the leading pulse has an intensity of 0 and the following pulse has an intensity of 1.

As described above, according to the first example, the bias voltage $DC_C$ applied to the phase shifter 101 causes a phase difference $\varphi=90°$ between the main arms. Further by setting the RF voltages $RF_A$ and $RF_B$ as illustrated in FIG. 9, the four constellation signal points S1 to S4 can be generated on the I-Q plane. Specifically, by turning off both the MZ modulators $MZ_A$ and $MZ_B$, it is possible to generate the constellation signal point S4 having an intensity of 0 in the I-Q plane shown in FIG. 9.

Further, as illustrated in FIG. 10, among the four constellation signal points S1 to S4 including the constellation signal point S4 having an intensity of 0, the Z0/Z1 state is generated by phase modulation between the constellation signal points S1 and S4 and the Y0/Y1 state is generated by phase modulation between the constellation signal points S2 and S3. In this way, it is possible to generate a four-state light signal required for the phase-time coding scheme.

<Bias Control>

The bias control of the nested modulator 100A described above is performed by maintaining the signal point S4 at the extinction state of intensity 0 and then maintaining the phase difference between the signal points S2 and S3 at 90°.

(a) Bias Control for Sub Interferometers

The signal point S4 is generated by RF voltages $RF_A$ and $RF_B$ causing the MZ modulators $MZ_A$ and $MZ_B$ to turn to off state (extinction state). To achieve such an off state, it is necessary to precisely adjust the phase modulation operating points of the MZ modulators $MZ_A$ and $MZ_B$ by controlling the respective bias voltages $DC_A$ and $DC_B$. According to the present example, the bias voltages $DC_A$ and $DC_B$ are adjusted to minimize the error rate $ER_Z$ of the Z basis, allowing the signal point S4 to be maintained at the zero-intensity extinction state on the I-Q plane.

The Z-basis error rate $ER_Z$ is used because the signal point S4 is in extinction state when the Z-basis error rate $ER_Z$ is minimized, and the Z-basis error rate $ER_Z$ is minimized when the signal point S4 is in the extinction state. Whether or not the signal point S4 becomes extinguished depends on the bias voltages $DC_A$ and $DC_B$ of the MZ modulators $MZ_A$ and $MZ_B$. Accordingly, the correct phase modulation operating point can be maintained by controlling the bias voltages $DC_A$ and $DC_B$ of the MZ modulators $MZ_A$ and $MZ_B$ so that the error rate $ER_Z$ of the Z basis is minimized.

(b) Bias Control of Main Interferometer

To maintain the phase difference between the signal points S2 and S3 at 90°, it is necessary to adjust the bias voltage $DC_C$ accurately so that the phase shifter 101 provides a phase difference $\varphi=90°$. According to the present example, the phase difference between the signal points S2 and S3 can be maintained at 90° by adjusting the bias voltage $DC_C$ to minimize the error rate $ER_Y$ of the Y basis.

The Z-basis error rate $ER_Y$ is used because the phase difference between the signal points S2 and S3 is 90° when the error rate $ER_Y$ of the Y basis is minimized, and the error rate $ER_Y$ of the Y basis is minimized when the phase difference between the signal points S2 and S3 is 90°. The phase difference between the signal points S2 and S3 depends on the bias voltage $DC_C$ of the phase shifter 101. Accordingly, the bias voltage $DC_C$ of the MZ interferometer $MZ_C$ is controlled so that the error rate $ER_Y$ of the Y basis is minimized, allowing the MZ interferometer $MZ_C$ to be maintained at the correct operating point.

(c) Sequence of Bias Control

As described above, the bias control (a) of the sub interferometers, MZ modulators $MZ_A$ and $MZ_B$, is performed first, and subsequently the bias control (b) of the main interferometer $MZ_C$ is performed. The reason is that the nested modulator 100A can converge more quickly to the appropriate operating point. Hereinafter, assuming that the constellation as shown in FIG. 7 shows ideal positions of signal points, FIGS. 11-14 illustrate how the signal points moves on I-Q plane depending on changes of the bias voltages.

Figure 11:
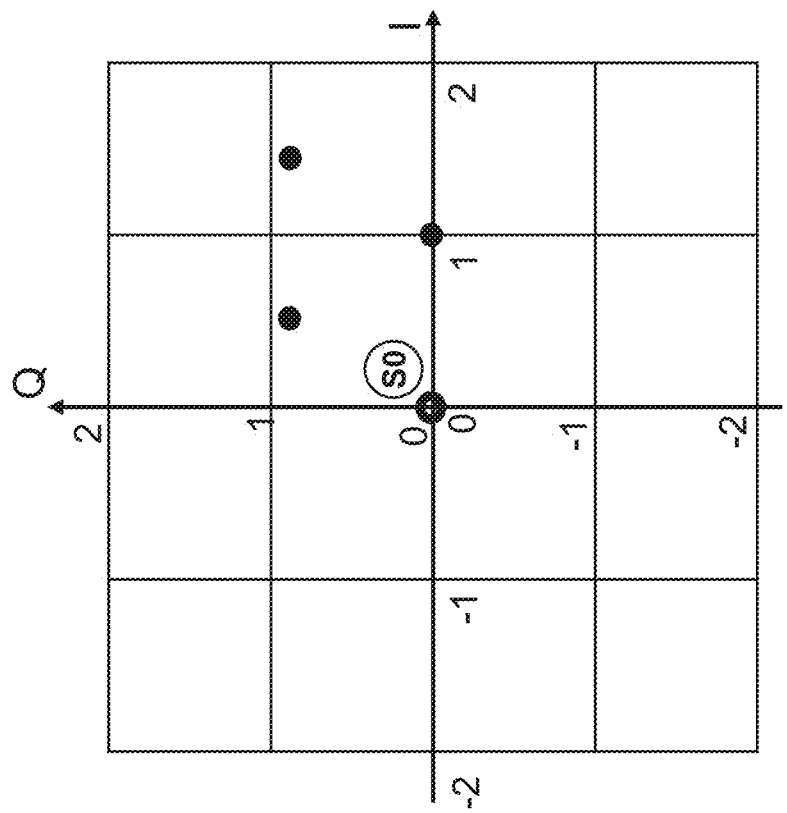
FIG. 11 is a diagram illustrating how the constellation of signal points on the I-Q plane obtained by the nested modulator as illustrated in FIG. 8 is displaced depending on changes in the bias voltage DC c.

As illustrated in FIG. 11, in a case where the DC biases of the MZ modulators $MZ_A$ and $MZ_B$ as sub interferometers are optimized, the signal point S0 can be maintained at the extinction state of intensity 0 on I-Q plane. In this state, the signal point S0 does not move even whether the bias voltage of the main interferometer, MZ interferometer $MZ_C$, is changed. Accordingly, the biases of the sub interferometers are optimized in advance, and the bias of the main interferometer can be converged to the optimal value. Conversely, even if the bias voltage of the main interferometer, MZ interferometer $MZ_C$, is out of optimal range, it can be easily optimized by simply bias setting of the sub interferometers, MZ modulators $MZ_A$ and $MZ_B$ so that they turn to the extinction state.

Figure 12:
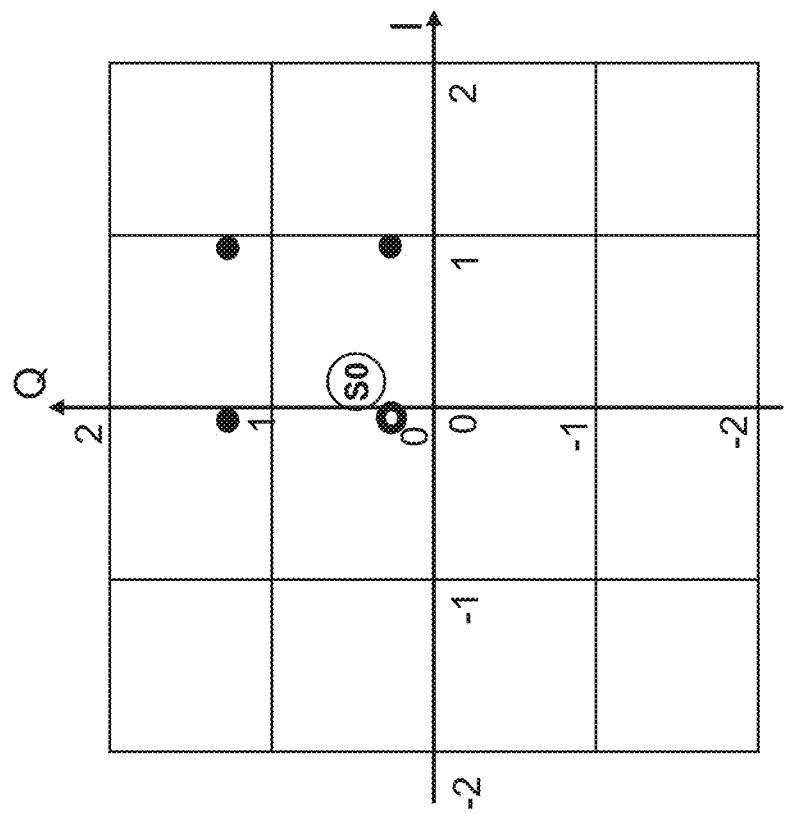
FIG. 12 is a diagram illustrating how the constellation of signal points on the I-Q plane obtained by the nested modulator as illustrated in FIG. 8 is displaced depending on changes in the bias voltage $DC_A$.
Figure 13:
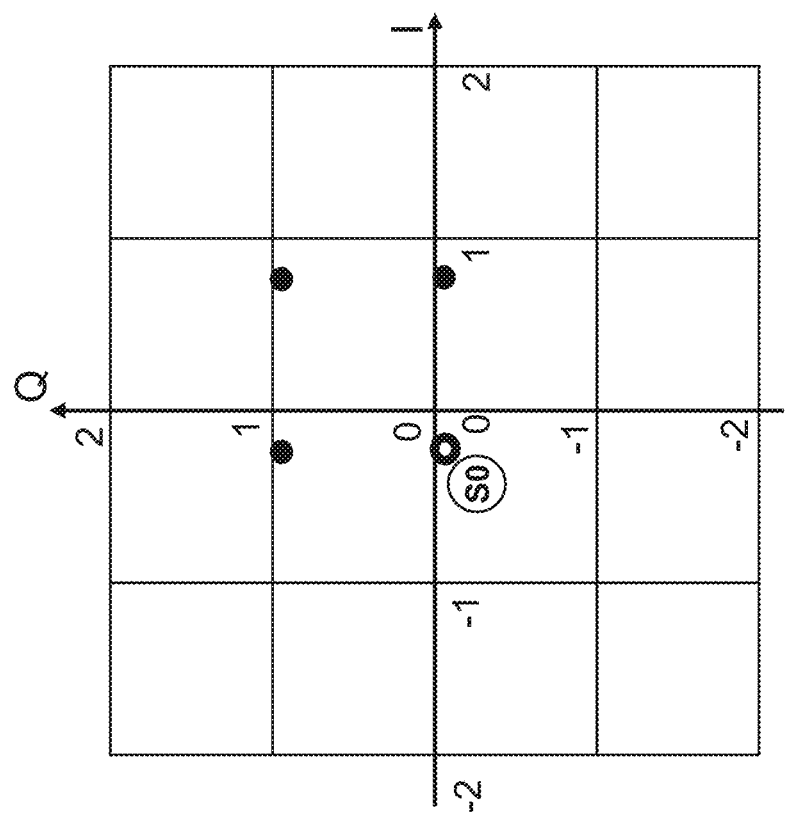
FIG. 13 is a diagram illustrating how the constellation of signal points on the I-Q plane obtained by the nested modulator as illustrated in FIG. 8 is displaced depending on changes in the bias voltage $DC_B$.

In contrast, when the bias voltages $DC_A$ and $DC_B$ of the sub interferometers, MZ modulators $MZ_A$ and $MZ_B$, are out of the optimal range, the signal point constellation moves as a whole on the I-Q plane with signal point S0 being out of extinction state as shown in FIGS. 12 and 13. Originally, the output light pulse $P2_A$ of the MZ modulator $MZ_A$ and the output light pulse $P2'_B$ of the phase shifter 101 with a phase difference of 90° are combined as shown in FIG. 5. However, when the signal point S0 is out of the extinction state, the output of MZ modulator $MZ_A/MZ_B$ are not extinguished. In such a case, the residual light pulses would be combined with a phase difference of 90°, resulting in a failure to converge to the optimum value. Accordingly, even if one tries to optimize the biases of the sub interferometers after optimizing the bias of the main interferometer, it cannot easily converge to the optimum value.

4. Receiver

The receiving unit 201 of the receiver 20 described above may be equipped with a receiving function of handling the four states Y0, Y1, Z0 and Z1 of phase-time coding. The following is an example of the specific configuration of the receiving unit 201 based on the receiver described in JP-P2008-270873A.

<First Example of Receiver>

Figure 14:
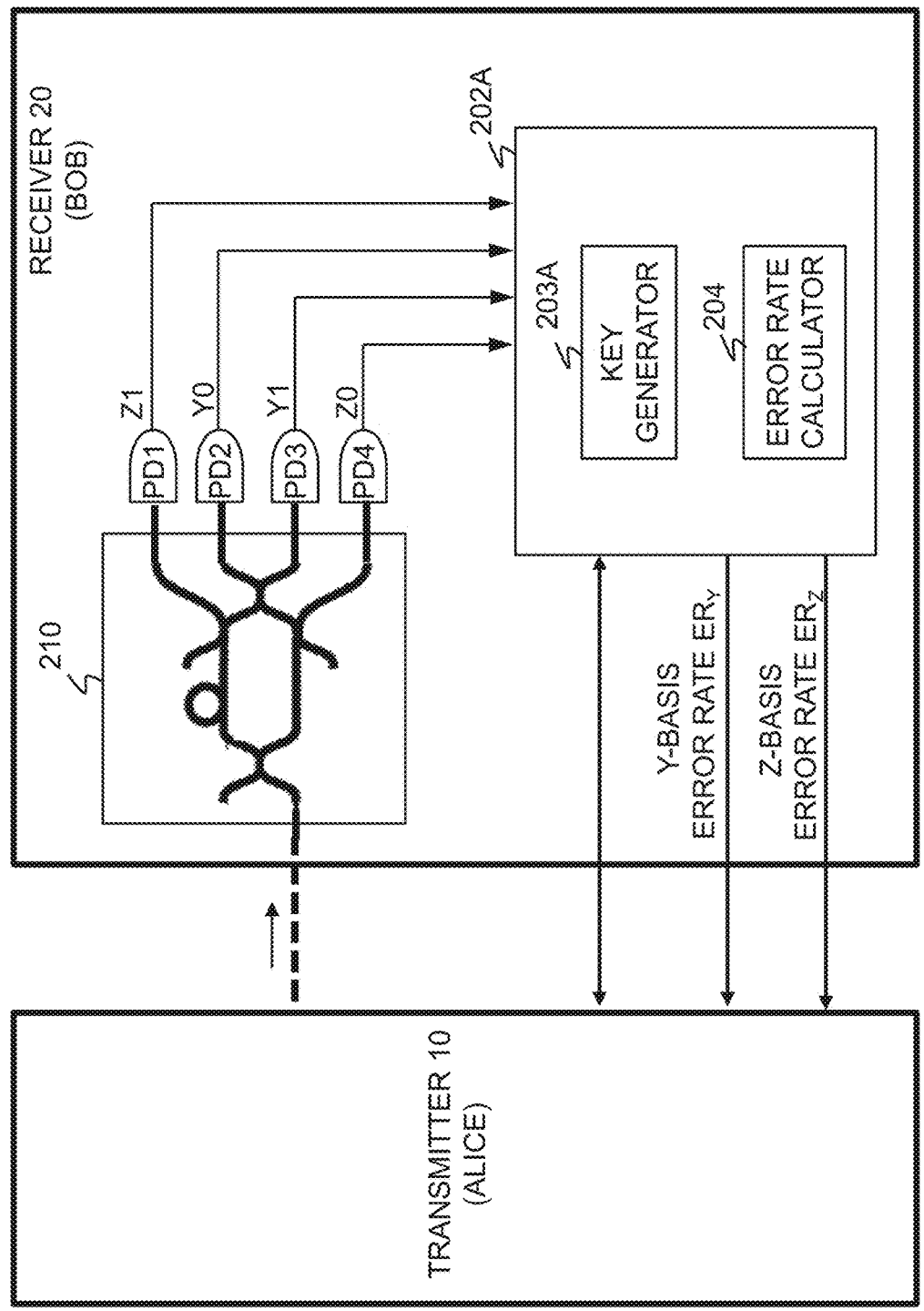
FIG. 14 is a schematic block diagram illustrating a first example of a receiver in the quantum cryptographic key distribution system according to the present example.

As illustrated in FIG. 14, a first example of the receiving unit 201 includes a 2-input, 4-output asymmetric MZ interferometer 210, and also four photon detectors PD1-PD4 each corresponding to the four outputs of the asymmetric MZ interferometer 210. The asymmetric MZ interferometer 210 simultaneously determines the basis and bit values from each double pulse arriving from the transmitter 10 and outputs a photon in one of the states Z1, Y0, Y1 and Z0. Accordingly, a key generator 203A of a data processor 202A can determine the basis and bit value of the double pulse depending on which one of the photon detectors PD1 to PD4 detects photon (see FIG. 1). The subsequent processes of basis reconciliation and error rate calculation have already been described.

<Second Example of Receiver>

Figure 15:
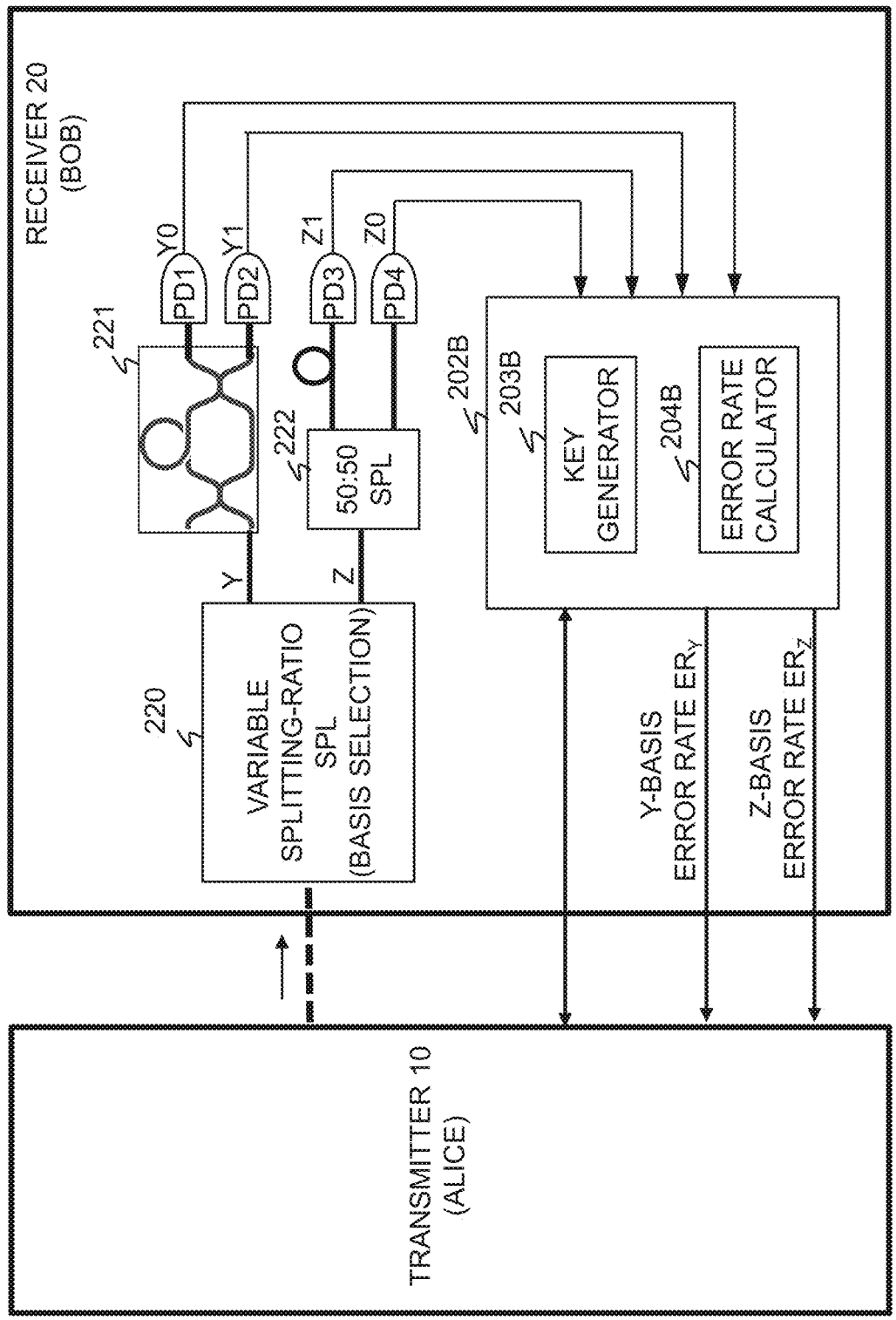
FIG. 15 is a schematic block diagram illustrating a second example of a receiver in the quantum cryptographic key distribution system according to the present example.

As illustrated in FIG. 15, a second example of the receiving unit 201 includes a splitter 220 with variable splitting ratio, a 2-input, 2-output asymmetric interferometer 221, a splitter 222 with 50:50 splitting ratio and four photon detectors PD1 to PD4. The asymmetric interferometer 221 is connected to the Y-basis output port of the splitter 220, and the splitter 222 is connected to the Z-basis output port of the splitter 220. The two output ports of the asymmetric interferometer 221 are connected to photon detectors PD1 and PD2, respectively, and the two output ports of the splitter 222 are connected to photon detectors PD3 and PD4, respectively.

Each double pulse output from the Y-basis port of the splitter 220 interfere in the asymmetric interferometer 221, and photons indicating Y-basis bit value 0 are output to the photon detector PD1 (Y0 state) and photons indicating Y-basis bit value 1 are output to the photon detector PD2 (Y1 state).

Each double pulse output from the Z-basis port of the splitter 220 is split by the splitter 222 into two split light pulses, which are detected by the photon detectors PD3 and PD4, respectively. In the Z-basis, as illustrated in FIG. 1, only the leading pulse P1 is extinguished in the Z0 state (bit 0) and only the following pulse P2 is extinguished in the Z1 state (bit 1). The photon output in the Z1 state is delayed by a time difference between two consecutive light pulses of the double pulse to output it to the photon detector PD3. Although this delay may be adjusted by the fiber length, it is practical to delay the timing of gate pulses applied to the photon detector PD3 with the same fiber length. Thus, photons indicating a Z-basis bit value of 1 are output to the photon detector PD3 (Z1 state), and photons indicating a Z-basis bit value of 0 are output to the photon detector PD4 (Z0 state).

As described above, a key generator 203B of a data processor 202B can determine the basis and bit value of each arrived double pulse depending on which one of the photon detectors PD1 to PD4 detects photons (see FIG. 1). The subsequent processes of basis reconciliation and error rate calculation have already been described.

5. Additional Statements

The present invention may be embodied in other specific forms without departing from the spirit or essential characteristics thereof. The above-described illustrative embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein. Part or all of the above-described illustrative embodiments can also be described as, but are not limited to, the following additional statements.

(Additional Statement 1)

A communication device in an optical communication system, comprising:
- a nested modulator of Mach-Zehnder configuration including; first and second sub modulators; and a phase shifter that provides a predetermined phase difference between outputs of the first and second sub modulators; and
- a controller configured to control the nested modulator by;
  a) modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity, wherein the double pulse thus modulated is transmitted to another communication device of the optical communication system;
b) controlling bias voltages applied respectively to the first and second sub modulators based on the transmission information and reception information at the other communication device so that a first error rate on the intensity modulation is minimized; and
c) controlling a bias voltage applied to the phase shifter based on the transmission information and the reception information so that a second error rate on the phase modulation is minimized.

(Additional Statement 2)
The communication device according to additional statement 1, wherein the controller performs the c) after having minimized the first error rate by the b).

(Additional Statement 3)
The communication device according to additional statement 1 or 2, wherein the first error rate and the second error rate are calculated from a first part of the transmission information and a second part of the reception information, wherein the reception information is generated by the other communication device receiving the double pulse subjected to intensity and phase modulation from the communication device.

(Additional Statement 4)
The communication device according to additional statement 3, wherein the controller receives the first error rate and the second error rate from the other communication device.

(Additional Statement 5)
The communication device according to additional statement 3, wherein the controller calculates the first error rate and the second error rate from the first part and the second part received from the other communication device.

(Additional Statement 6)
The communication device according to any of additional statements 1-5, wherein the controller is further configured to:
change the double pulse among four constellation signal points including first to fourth constellation signal points on I-Q plane,
control the bias voltages applied respectively to the first and second sub modulators to set the first constellation signal point at light intensity 0,
control the bias voltage applied to the phase shifter to set a phase difference between the third and fourth constellation signal points at 90 degrees,
wherein the second constellation signal point indicates relative light intensity 1, each of the third and the fourth constellation signal points indicates relative light intensity ranging from 0 to 1.

(Additional Statement 7)
The communication device according to any of additional statements 1-6, wherein the nested modulator performs the phase modulation and the intensity modulation on the double pulse including two consecutive coherent light pulses according to phase-time coding scheme, and
wherein the controller is further configured to generate Z-basis state of the phase-time coding scheme from the intensity modulation and Y-basis state of the phase-time coding scheme from the phase modulation.

(Additional Statement 8)
A quantum key distribution system comprising the communication device according to additional statement 7 and the other communication device.

(Additional Statement 9)
A bias control method in a transmitter including: a nested modulator of Mach-Zehnder configuration which includes first and second sub modulators and a phase shifter that provides a predetermined phase difference between outputs of the first and second sub modulators; and a controller configured to control the nested modulator, the bias control method comprising:
a) modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity, wherein the double pulse thus modulated is transmitted to a receiver of the optical communication system;
b) controlling bias voltages applied respectively to the first and second sub modulators based on the transmission information and reception information at the receiver so that a first error rate on the intensity modulation is minimized; and
c) controlling a bias voltage applied to the phase shifter based on the transmission information and the reception information so that a second error rate on the phase modulation is minimized.

(Additional Statement 10)
The bias control method according to additional statement 9, wherein the c) is performed after having minimized the first error rate by the b).

(Additional Statement 11)
The bias control method according to additional statement 9 or 10, further comprising:
calculating the first error rate and the second error rate from a first part of the transmission information and a second part of the reception information, wherein the reception information is generated by the receiver receiving the double pulse subjected to intensity and phase modulation from the transmitter, wherein at least one of the first part and the second part is notified between the transmitter and the receiver.

(Additional Statement 12)
An optical communication system comprising a transmitter and a receiver,
the transmitter comprising:
a nested modulator of Mach-Zehnder configuration including: first and second sub modulators; and a phase shifter that provides a predetermined phase difference between outputs of the first and second sub modulators; and
a controller configured to control the nested modulator by: modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity; and transmitting the double pulse thus modulated to the receiver;

the receiver comprising:
- a receiving unit configured to receive the double pulse subjected to intensity and phase modulation to obtain reception information; and
- an error calculator that calculates a first error rate on the intensity modulation and a second error rate on the phase modulation based on a first part of the transmission information and a second part of the reception information, wherein the first part and the second part are notified between the transmitter and the receiver, wherein the controller of the transmitter controls bias voltages applied respectively to the first and second sub modulators so that the first error rate is minimized, and controls a bias voltage applied to the phase shifter so that the second error rate is minimized.

(Additional Statement 13)

The optical communication system according to additional statement 12, wherein the controller minimizes the first error rate before minimizing the second error rate.

(Additional Statement 14)

The optical communication system according to additional statement 12 or 13, wherein the nested modulator performs the phase modulation and the intensity modulation on the double pulse including two consecutive coherent light pulses according to phase-time coding scheme, and
- wherein the controller is further configured to generate Z-basis state of the phase-time coding scheme based on the intensity modulation and Y-basis state of the phase-time coding scheme based on the phase modulation.

(Additional Statement 15)

The optical communication system according to additional statement 14, wherein
- the receiving unit is configured to generate the reception information in Z-basis state and Y-basis state from the double pulse subjected to intensity and phase modulation, and
- the error calculator calculate a Z-basis error rate on the Z basis state and a Y-basis error rate on the Y basis state, wherein the Z-basis error rate as the first error rate and the Y-basis error rate the second error rate are notified to the transmitter.

(Additional Statement 16)

A program for causing a computer to function as a controller for controlling a nested modulator of Mach-Zehnder configuration which includes first and second sub modulators and a phase shifter that provides a predetermined phase difference between outputs of the first and second sub modulators, the program comprising instructions to:
a) modulate a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity, wherein the double pulse thus modulated is transmitted to a receiver;
b) control bias voltages applied respectively to the first and second sub modulators based on the transmission information and reception information at the receiver so that a first error rate on the intensity modulation is minimized; and
c) control a bias voltage applied to the phase shifter based on the transmission information and the reception information so that a second error rate on the phase modulation is minimized.

(Additional Statement 17)

A communication device communicable with another communication device in an optical communication system, comprising:
- a nested modulator of Mach-Zehnder configuration including: first and second sub modulators; and a phase shifter that provides a predetermined phase difference between outputs of the first and second sub modulators; and
- a controller configured to control the nested modulator by:
  a) modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity, wherein the double pulse thus modulated is transmitted to the other communication device of the optical communication system;
  b) calculating a first error rate on the intensity modulation and a second error rate on the phase modulation based on a first part of the transmission information and a second part of the reception information, wherein the first part and the second part are notified between the communication device and the other communication device;
  c) controlling bias voltages applied respectively to the first and second sub modulators so that the first error rate is minimized; and
  c) controlling a bias voltage applied to the phase shifter so that the second error rate is minimized.

The present invention can be applied to transmitters in optical communication systems, especially in transmitters for quantum key delivery systems.

DESCRIPTION OF SIGNS

10 Transmitter (Communication device)
20 Receiver (other communication device)
100 Nested modulator
101 Phase Shifter
102 RF electrode
103, 104 Ground (GND) electrode
105 DC bias electrode
110 Modulation controller
111, 112 Bias controller
201 Receiving unit
202 Data processor
203 Key generator
204 Error rate calculator
205 Communication unit
$MZ_A$, $MZ_B$ MZ modulator (sub interferometer)
$MZ_C$ MZ Interferometer (main interferometer)
$RF_A$, $RF_B$ High frequency voltage
$DC_A$, $DC_B$, $DC_C$ DC bias voltage
301 Laser light source
302 Asymmetric interferometer
303 Attenuator
310 RF driver
311 Bias driver
312 Communication unit
313 Controller
314 Program memory

The invention claimed is:

1. A communication device in an optical communication system, comprising:
a nested modulator of Mach-Zehnder configuration including: first and second sub modulators; and a phase shifter that provides a predetermined phase difference between outputs of the first and second sub modulators; and
a controller configured to control the nested modulator by:
a) modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity, wherein the double pulse thus modulated is transmitted to another communication device of the optical communication system;
b) controlling bias voltages applied respectively to the first and second sub modulators based on the transmission information and reception information at the other communication device so that a first error rate on the intensity modulation is minimized; and
c) controlling a bias voltage applied to the phase shifter based on the transmission information and the reception information so that a second error rate on the phase modulation is minimized.

2. The communication device according to claim 1, wherein the controller performs the c) after having minimized the first error rate by the b).

3. The communication device according to claim 1, wherein the first error rate and the second error rate are calculated from a first part of the transmission information and a second part of the reception information, wherein the reception information is generated by the other communication device receiving the double pulse subjected to intensity and phase modulation from the communication device.

4. The communication device according to claim 3, wherein the controller receives the first error rate and the second error rate from the other communication device.

5. The communication device according to claim 3, wherein the controller calculates the first error rate and the second error rate from the first part and the second part received from the other communication device.

6. The communication device according to claim 1, wherein the controller is further configured to:
change the double pulse among four constellation signal points including first to fourth constellation signal points on I-Q plane,
control the bias voltages applied respectively to the first and second sub modulators to set the first constellation signal point at light intensity 0,
control the bias voltage applied to the phase shifter to set a phase difference between the third and fourth constellation signal points at 90 degrees,
wherein the second constellation signal point indicates relative light intensity 1, each of the third and the fourth constellation signal points indicates relative light intensity ranging from 0 to 1.

7. The communication device according to claim 1, wherein the nested modulator performs the phase modulation and the intensity modulation on the double pulse including two consecutive coherent light pulses according to phase-time coding scheme, and
wherein the controller is further configured to generate Z-basis state of the phase-time coding scheme from the intensity modulation and Y-basis state of the phase-time coding scheme from the phase modulation.

8. A quantum key distribution system comprising the communication device according to claim 7 and the other communication device.

9. A bias control method in a transmitter including:
a nested modulator of Mach-Zehnder configuration which includes first and second sub modulators and a phase shifter that provides a predetermined phase difference between outputs of the first and second sub modulators; and
a controller configured to control the nested modulator, the bias control method comprising
a) modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity, wherein the double pulse thus modulated is transmitted to a receiver of an optical communication system;
b) controlling bias voltages applied respectively to the first and second sub modulators based on the transmission information and reception information at the receiver so that a first error rate on the intensity modulation is minimized; and
c) controlling a bias voltage applied to the phase shifter based on the transmission information and the reception information so that a second error rate on the phase modulation is minimized.

10. The bias control method according to claim 9, wherein the c) is performed after having minimized the first error rate by the b).

11. The bias control method according to claim 9, further comprising:
calculating the first error rate and the second error rate from a first part of the transmission information and a second part of the reception information, wherein the reception information is generated by the receiver receiving the double pulse subjected to intensity and phase modulation from the transmitter, wherein at least one of the first part and the second part is notified between the transmitter and the receiver.

12. An optical communication system comprising a transmitter and a receiver,
the transmitter comprising:
a nested modulator of Mach-Zehnder configuration including: first and second sub modulators; and a phase shifter that provides a predetermined phase difference between outputs of the first and second sub modulators; and
a controller configured to control the nested modulator by: modulating a double pulse including two consecutive light pulses by phase modulation and intensity modulation according to transmission information, wherein the phase modulation is performed on a relative phase between the two consecutive light pulses and the intensity modulation is performed on either one of the two consecutive light pulses to turn off it in intensity; and transmitting the double pulse thus modulated to the receiver;
the receiver comprising:
a receiving unit configured to receive the double pulse subjected to intensity and phase modulation to obtain reception information; and an error calculator that calculates a first error rate on the intensity modulation and a second error rate on the phase modulation based on a first part of the transmission information and a second part of the reception information, wherein the first part and the second part are notified between the transmitter and the receiver, wherein the controller of the transmitter controls bias voltages applied respectively to the first and second sub modulators so that the first error rate is minimized, and controls a bias voltage applied to the phase shifter so that the second error rate is minimized.

13. The optical communication system according to claim 12, wherein the controller minimizes the first error rate before minimizing the second error rate.

14. The optical communication system according to claim 12, wherein the nested modulator performs the phase modulation and the intensity modulation on the double pulse including two consecutive coherent light pulses according to phase-time coding scheme, and wherein the controller is further configured to generate Z-basis state of the phase-time coding scheme based on the intensity modulation and Y-basis state of the phase-time coding scheme based on the phase modulation.

15. The optical communication system according to claim 14, wherein the receiving unit is configured to generate the reception information in Z-basis state and Y-basis state from the double pulse subjected to intensity and phase modulation, and the error calculator calculate a Z-basis error rate on the Z basis state and a Y-basis error rate on the Y basis state, wherein the Z-basis error rate as the first error rate and the Y-basis error rate the second error rate are notified to the transmitter.

* * * * *